United States Patent [19]

Boston

[11] Patent Number: 5,076,048
[45] Date of Patent: Dec. 31, 1991

[54] FUEL CONTROL SYSTEM FOR GAS TURBINE ENGINE

[75] Inventor: James L. Boston, Bristol, England

[73] Assignee: Rolls-Royce plc, England

[21] Appl. No.: 609,762

[22] Filed: Nov. 7, 1990

[30] Foreign Application Priority Data

Nov. 25, 1989 [GB] United Kingdom ............... 8926691

[51] Int. Cl.$^5$ .............................................. F02C 9/28
[52] U.S. Cl. ..................................... 60/39.281; 60/243
[58] Field of Search ................. 60/39.27, 39.281, 235, 60/240, 243

[56] References Cited

U.S. PATENT DOCUMENTS

| | | |
|---|---|---|
| 3,520,133 | 7/1970 | Loft et al. ........................ 60/39.281 |
| 4,212,161 | 7/1980 | Newirth et al. .................. 60/39.281 |
| 4,270,346 | 6/1981 | Dawson ................................ 60/243 |
| 4,928,482 | 5/1990 | Pollak et al. ...................... 60/39.27 |

FOREIGN PATENT DOCUMENTS 1184369 3/1970 United Kingdom .

Primary Examiner—Louis J. Casaregola
Attorney, Agent, or Firm—Oliff & Berridge

[57] ABSTRACT

The throttle fuel flow of an aircraft jet engine is controlled by measuring the actual value of an engine parameter demand and measuring the error between the actual value and a value of the parameter demand calculated from a number of engine operating data. The error is then used to drive an integrating fuel throttle value until the error is substantially zero. The engine parameter chosen is the high pressure compressor delivery mach number.

6 Claims, 4 Drawing Sheets

FUEL CONTROL SYSTEM FOR GAS TURBINE ENGINE

This invention concerns a fuel control system for a gas turbine engine.

A known technique for controlling the fuel flow supply to an aircraft jet engine relies on knowing the characteristics of a calibrated fuel metering valve. An example of the implementation of such prior art technique is shown in FIGS. 1a and 1b of the accompanying schematic drawings, FIGS. 1a and 1b being block diagrams outlining the operation of a known jet engine fuel control system.

The following abbreviations will be used in the description of the drawings:

DECU: digital electronic control unit
FCU: fuel control unit
MMV: main metering valve
MN HP: compressor delivery Mach number
NH HP: compressor speed
NHDOT HP: spool acceleration
NL LP: spool speed
P1: fuel inlet pressure
P2: fuel delivery pressure to MMV
P3: fuel pressure at outlet from the MMV
PDU: pressure drop unit
PE3: HP compressor delivery pressure
PLA: pilot's lever angle
PRV: pressure raising valve
PSO: free stream static pressure
PTO: free stream total pressure
TBT: turbine blade temperature
TT1: intake total temperature.

FIGS. 1a and 1b show a jet engine 10, a DECU 12, a pump 14, a MMV 16, a PRV 18, a PDU 20 and, in FIG. 1b, a resolver 22. The MMV 16 includes a torque motor and a servo 19. The DECU 12 includes a NHDOT control unit 24 which provides engine control by means of software.

The DECU 12 receives an input from the PLA (ie a measure of the engine thrust required by the pilot) and inputs from various engine parameters (NL, NH, TBT, P3 etc) and delivers a torque motor demand to the MMV 16.

The fuel pump 14 receives fuel at a pressure P1 from a fuel supply and delivers it at pressure P2 to the MMV 16. The MMV 16 delivers the fuel at pressure P3 to the PRV 18 which delivers a fuel flow W to the engine 10. The PRV ensures that there is sufficient pump pressure rise to operate the MMV servo. The PDU maintains the pressure drop P2-P3 across the MMV to a constant value. Because of the action of the PDU the MMV has a known fuel flow (W) to displacement (X) relationship. This relationship is used, via a closed loop control of the MMV position, to achieve the desired engine fuel flow generated by the NHDOT control logic (WFD).

It is an object of the present invention to provide a jet engine fuel control system which has significant advantages over current technology in terms of weight, reliability and cost, by simplification of the hydromechanical component content.

In general terms the present invention uses feedback of an engine parameter to regulate throttle fuel flow, thereby simplifying hardware requirements.

In particular, there may be provided a fuel control system for an aircraft gas turbine engine having a low pressure compressor, a high pressure compressor, and a fuel throttle valve for delivering fuel to the engine, the system comprising:

a: means for generating a set of signals indicative of a set of engine operating data, the set of data including at least high pressure compressor delivery pressure (PE3), low pressure spool speed (NL) and turbine blade temperature (TBT), b: means for calculating a high pressure delivery Mach number (MN) demand from the set of signals, c: means for generating a first signal indicative of the actual high pressure compressor delivery Mach number and calculating said actual high pressure compressor delivery Mach number from said first signal, d: means for calculating the difference between MN and the actual Mach number, and e: means for generating a second signal proportional to said difference and feeding said second signal into a throttle drive circuit which is adapted to produce a throttle drive current to drive the fuel throttle valve.

The engine parameter is preferably the high pressure compressor delivery Mach number.

The invention enables the hardware of the prior art fuel supply system outlined above to be simplified by deleting the PDU and PRV, and simplifying the MMV by deleting mechanical feedback and resolver valve position pick-off.

The invention will now be described with reference to the accompanying drawings.

Figure 1A:
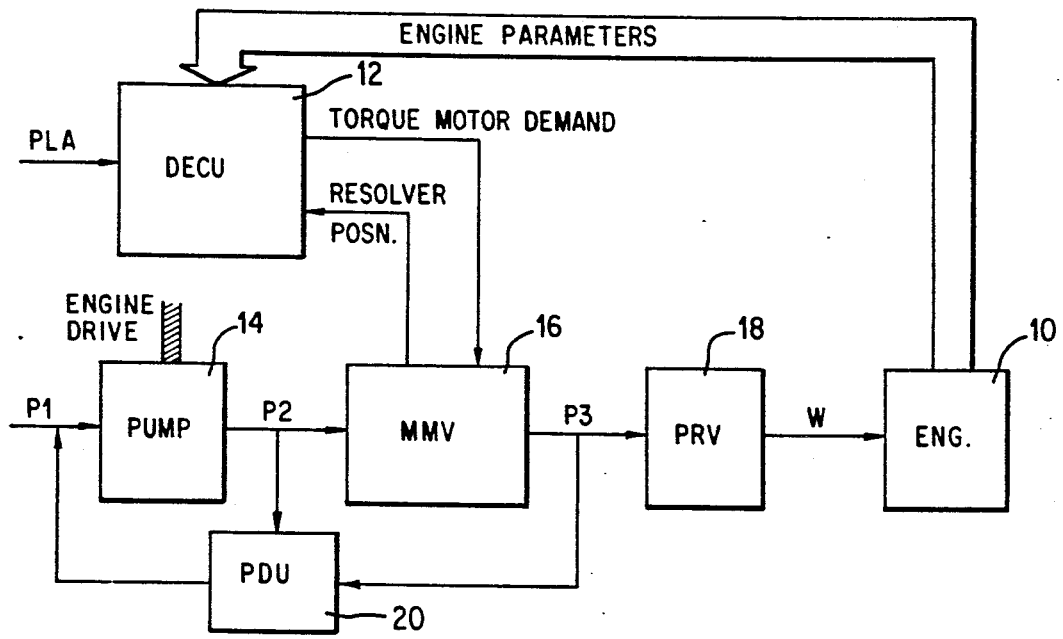
FIGS. 1a and 1b show a prior rt jet engine fuel control.
Figure 1B:
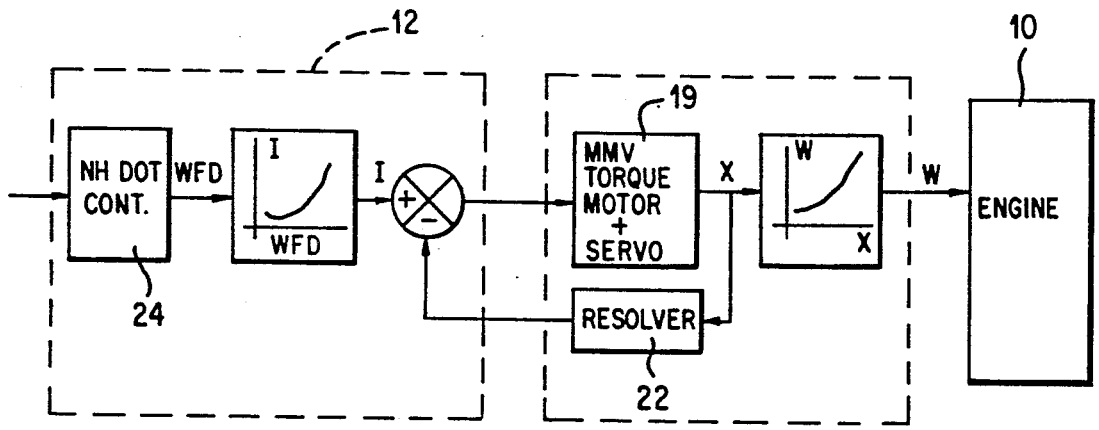
Figure 2:
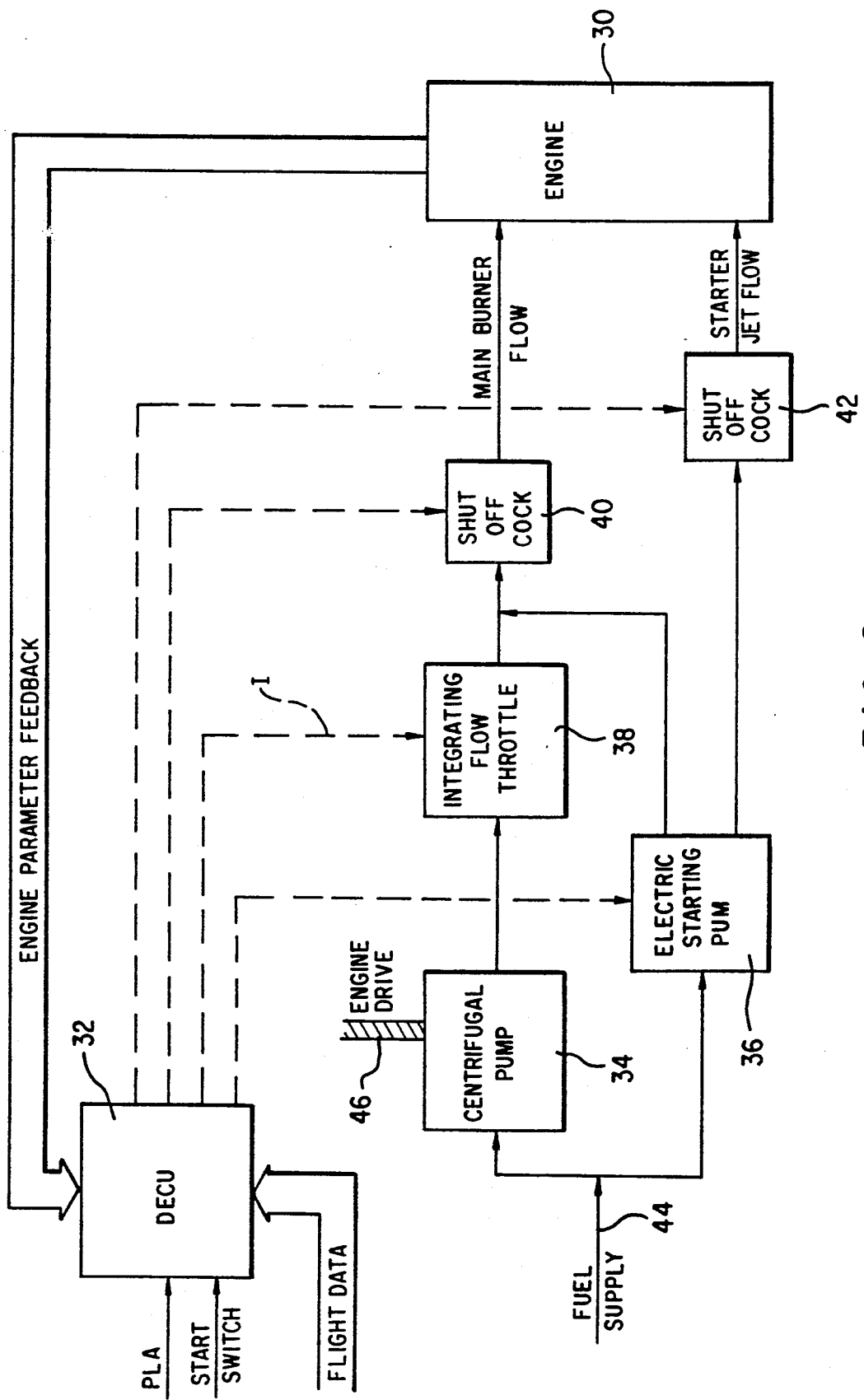
FIGS. 2 and 3 are general block diagram arrangements of a jet engine fuel supply system according to the invention.
Figure 3:
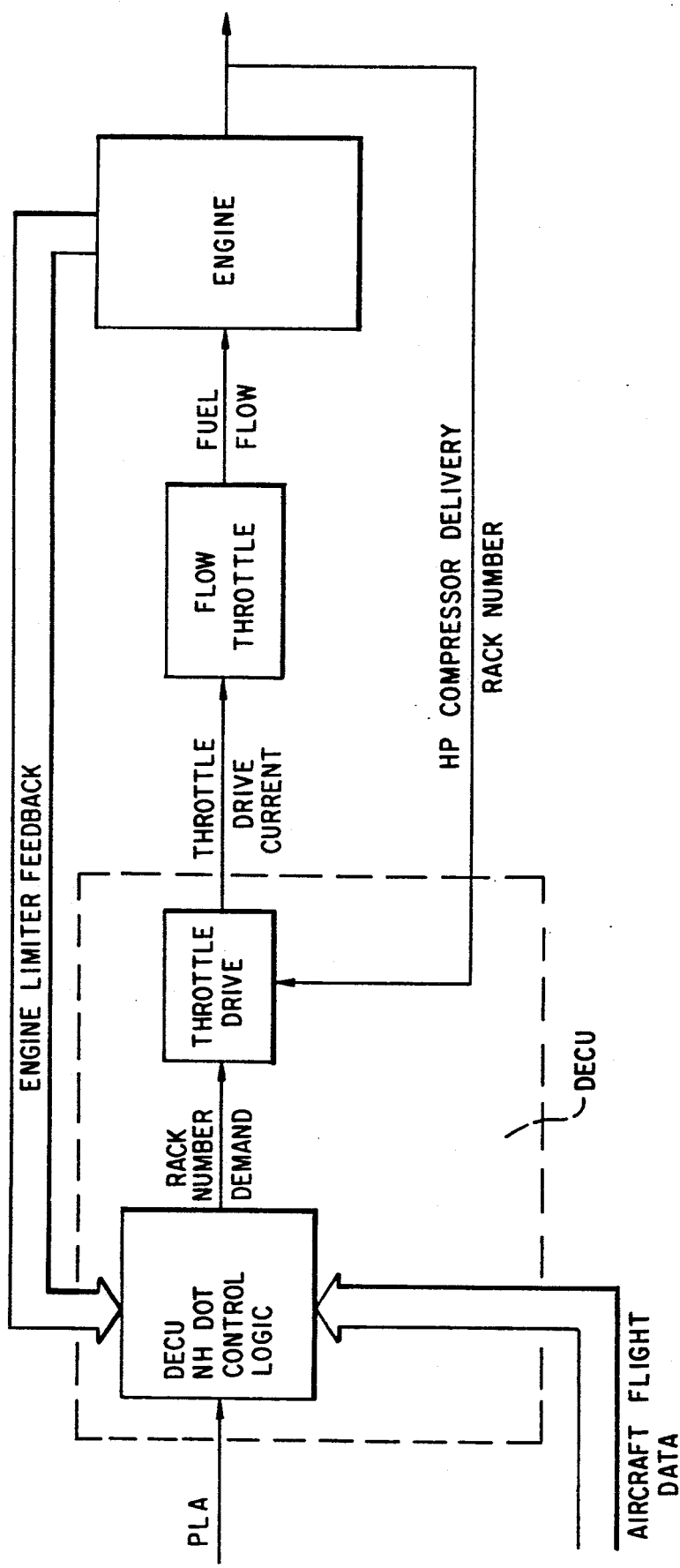

Referring to FIGS. 2 and 3 there is shown an engine 30, a DECU 32, a main pump 34, an electric starting pump 36, an integrating main throttle 38, a first shut-off cock 40 for the main burner flow, and a second shut-off cock 42 for the starter jet flow. Although shown as two valves, the shut-off cocks 40, 42 could be combined in a single three-position valve.

The DECU 32 processes pilot demands together with engine and aircraft flight data to generate the outputs required to drive the hydromechanical units controlling the fuel supply to the engine.

The following parameter measurements are fed to the DECU. Free stream total pressure PTO, free stream static pressure PSO, intake total temperature TT1, engine low pressure (LP) spool speed NL, engine high pressure (HP) spool speed NH, HP compressor delivery pressure PE3, turbine blade temperature TBT, HP compressor delivery Mach number MN, pilot's lever angle PLA, and a number of aircraft flight parameters. As a consequence of the parameters fed into the DECU 32, the DECU produces a throttle demand current I.

The main pump 34 receives fuel from a fuel supply line 44 and is driven by a mechanical power take-off 46 from the engine 30. The pump 34 is chosen to be of the centrifugal type because this most easily satisfies the rapid flow changes demanded of the fuel supply.

As a consequence of using a centrifugal system for the pump 34, fuel delivery pressures during start-up may be inadequate. It is therefore necessary to provide an electrically driven starting pump 36 under control of the DECU 32.

The integrating main throttle 38 is provided at the outlet of the main pump 34. The opening/closing rate of the main throttle is proportional to the DECU demand current I.

The system supplies two distinct fuel flows each of which must be shut-off independently by shut-off cocks 40, 42 controlled by the DECU.

The DECU NHDOT control logic processes the pilot demands and engine and aircraft flight data to produce a Mach number demand. This is compared with the actual Mach number measured at the engine HP compressor delivery. The error, or difference, between the two is used to generate the throttle drive current I via a dynamic compensation. Because the flow throttle is an integrating valve its opening/closing rate is proportional to the drive current I which in turn is proportional to the Mach number error. There is no throttle position feedback, so the valve 38 continues to open or close as the case may be until the error between the demanded and feedback values of Mach number MN is substantially zero.

Figure 4:
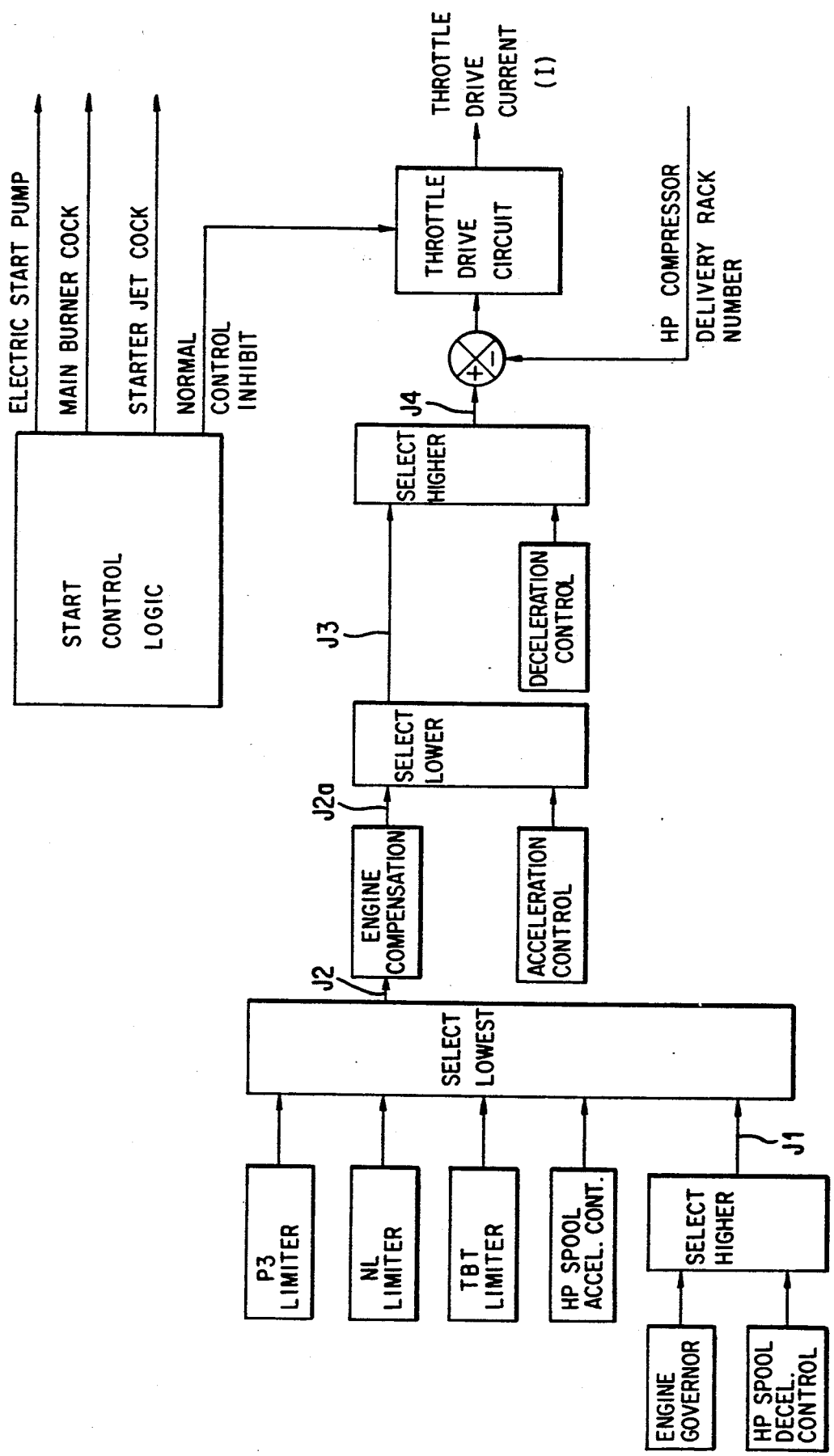
FIG. 4 is a logic diagram of the DECU shown in FIGS. 2 and 3.

FIG. 4 outlines the logic stages whereby comparisons are performed between various engine parameters to derive the Mach number demand.

Starting at the left hand side of FIG. 4, in the first logic stage signals from the engine governor and the HP (high pressure) spool deceleration control are compared and the higher signal of the two is chosen as the first stage output signal J1.

In the second logic stage a set of signals comprising J1 (from the first stage), PE3 limiter, NL limiter, TBT limiter and HP spool acceleration control are compared and the lowest signal is chosen as the second stage output signal J2.

In the third logic stage signal J2 passes through an engine compensation circuit which generates a signal J2a. An acceleration control signal is then compared with signal J2a and the lower value of the two is chosen as the third stage output signal J3.

In the fourth logic stage the output signal J3 from the third stage is compared with a deceleration control signal and the larger value of the two is chosen as the fourth and final stage output J4, the Mach number demand.

The difference, or error, between the Mach number demand J4 and the measures HP compressor Mach number is determined and fed into a throttle drive circuit which produces the throttle drive current I.

The throttle drive circuit also receives an input from a start control logic circuit which provides for inhibition of the throttle drive circuit under start-up conditions.

I claim:

1. A fuel control system for an aircraft gas turbine engine having a low pressure compressor, a high pressure compressor, and a fuel throttle valve for delivering fuel to the engine, the system comprising:
   a: means for generating a set of signals indicative of a set of engine operating data, the set of data including at least high pressure compressor delivery pressure (PE3), low pressure spool speed (NL) and turbine blade temperature (TBT),
   b: means for calculating a high pressure delivery Mach number (MN) demand from the set of signals,
   c: means for generating a first signal indicative of the actual high pressure compressor delivery Mach number and calculating said actual high pressure compressor delivery Mach number from said first signal,
   d: means for calculating the difference between MN and the actual Mach number, and
   e: means for generating a second signal proportional to said difference and feeding said second signal into a throttle drive circuit which is adapted to produce a throttle drive current to drive the fuel throttle valve.

2. A fuel control system as claimed in claim 1 wherein the set of data includes data from an engine governor, high pressure spool deceleration control, and high pressure spool acceleration control.

3. A fuel control system as claimed in claim 1 wherein the fuel throttle valve is an integrating valve in which the opening/closing rate of the valve is proportional to said second signal, and wherein said second signal is used to drive the valve until said second signal is substantially zero.

4. A fuel control system as claimed in claim 1 wherein the means for calculating the high pressure Mach number demand is provided by a set of logic stages using said set of data as input.

5. A fuel control system as claimed in claim 4 wherein there are provided four chained logic stages in which,
   a: the first stage is arranged to accept as input, signals form an engine governor and/or the high pressure spool deceleration control, to compare the last-mentioned signals, and to produce an output signal J1 being the larger value of said last-mentioned input signals,
   b: the second stage is arranged to accept as input a set of signals comprising J1 (from the first stage), PE3 limiter, NL limiter, TBT limiter, and/or the high pressure spool acceleration control, to compare the signals in the last-mentioned set, and to produce an output signal J2 being the smallest value signal in said last-mentioned set,
   c: the third stage includes an engine compensation circuit and is arranged to accept as input, signal J2 (from the second stage) and an acceleration control signal, to pass signal J2 through the engine compensation circuit to produce a signal J2A, to compare signal J2A with the acceleration control signal, and to produce an output signal J3 being the smaller value of signal J2A and the acceleration control signal, and
   d: the fourth stage is arranged to accept as input, signal J3 (from the third stage) and a deceleration control signal, to compare the two last-mentioned signals and to produce an output signal J4, the Mach number demand, being the larger value of said two last-mentioned signals.

6. A fuel control system as claimed in claim 5 wherein the throttle drive circuit is arranged to receive an input signal from a start control logic circuit so as to provide for inhibition of the throttle drive circuit under start-up conditions.

* * * * *